United States Patent
Teramura et al.

(10) Patent No.: US 6,535,938 B1
(45) Date of Patent: Mar. 18, 2003

(54) SERVO-AMPLIFIER FOR A MULTIAXIS DRIVING CONTROL SYSTEM

(75) Inventors: Mamoru Teramura, Tokyo (JP); Kouki Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/436,645

(22) Filed: Nov. 9, 1999

(30) Foreign Application Priority Data

Jul. 2, 1999 (JP) .......................................... 11-189570

(51) Int. Cl.[7] .............................................. G06F 13/42
(52) U.S. Cl. ....................... 710/105; 710/106; 710/315; 710/316; 180/169; 180/272
(58) Field of Search ................................ 710/105, 315; 180/169, 272

(56) References Cited

U.S. PATENT DOCUMENTS

| | | | | |
|---|---|---|---|---|
| 3,659,271 A | * | 4/1972 | Collins et al. ............. | 370/452 |
| 5,033,000 A | * | 7/1991 | Littlejohn et al. .......... | 180/272 |
| 5,315,515 A | * | 5/1994 | Schmitz ...................... | 180/167 |
| 6,076,622 A | * | 6/2000 | Chakraborty et al. ....... | 180/169 |

FOREIGN PATENT DOCUMENTS

| | | |
|---|---|---|
| JP | 3-251903 | 11/1991 |
| JP | 06-110510 | 4/1994 |

* cited by examiner

*Primary Examiner*—Glenn A. Auve
*Assistant Examiner*—Justin King
(74) *Attorney, Agent, or Firm*—Sughrue Mion, PLLC (57) ABSTRACT

A servo-amplifier has a RS232C-communication I/F circuit, a RS422 (RS485) communication I/F circuit, and a CPU 11. The CPU 11 of this servo-amplifier fetches data received by the RS232C-communication I/F circuit into a local station, converts the received data to communication data for RS422 (RS485) and transmits the converted data from the RS422 (RS485) communication I/F circuit to other stations, converts the data received by the RS422 (RS485) communication I/F circuit to communication data for RS232C and transmits the converted data from the RS232C-communication I/F circuit to other stations.

3 Claims, 6 Drawing Sheets

SERVO-AMPLIFIER FOR A MULTIAXIS DRIVING CONTROL SYSTEM

FIELD OF THE INVENTION

The present invention relates to a servo-amplifier for a multiaxis driving control system. More particularly this invention relates to a servo-amplifier with a communication interface for performing multi-drop communications in a multiaxis driving control system including RS232C by a personal computer or the like and a plurality of servo-amplifiers.

BACKGROUND OF THE INVENTION

Figure 6:
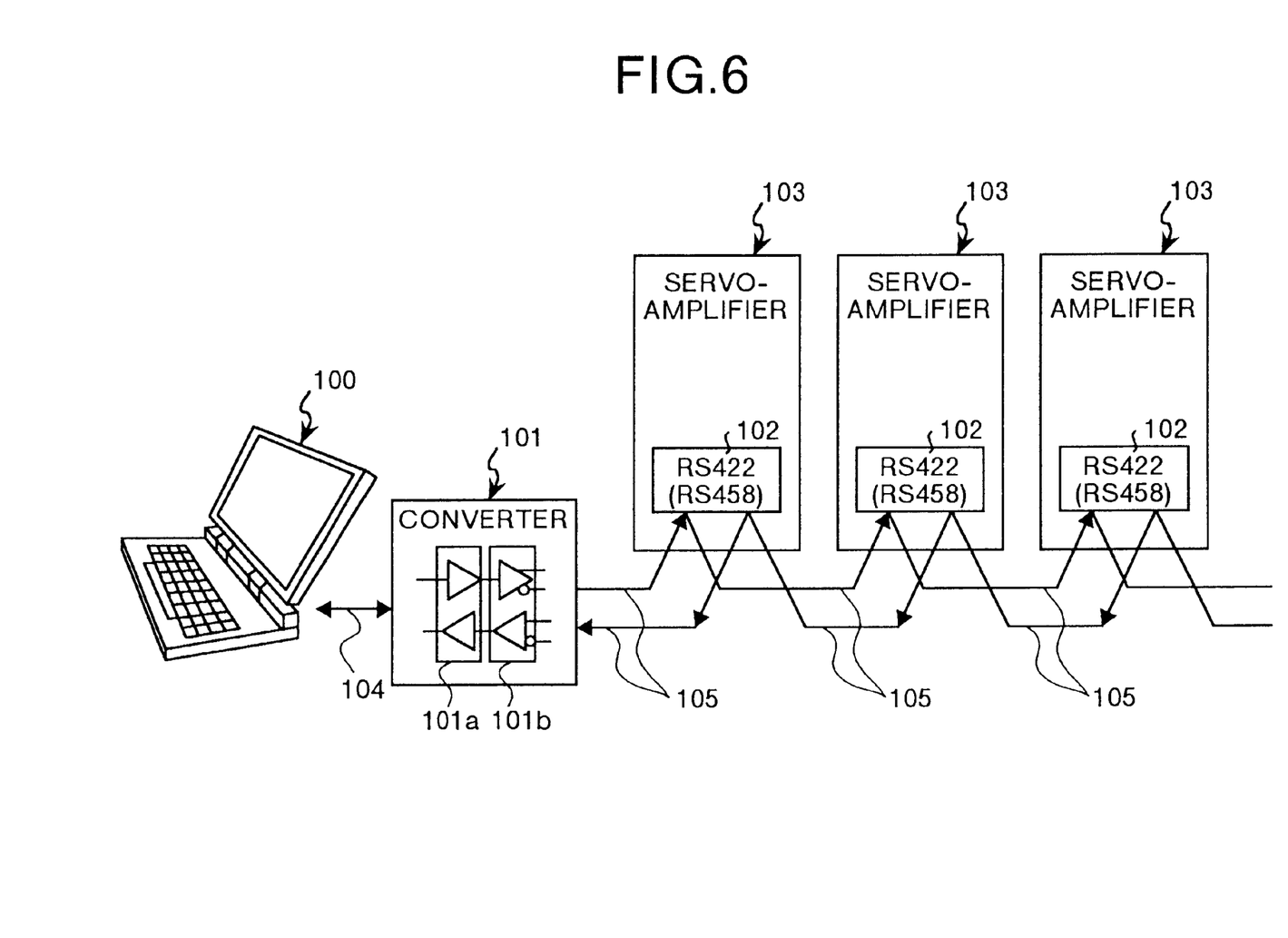
FIG. 6 shows the system configuration of a multiaxis driving control system based on the conventional technology.

FIG. 6 shows a conventional type of multiaxis driving control system that performs multi-drop communications. This multiaxis driving control system comprises a RS232C communication medium 100 by a personal computer or the like that performs the main control over the communications, a converter 101 having a RS232C-compatible IC driver 101a and a RS422 (RS485)-compatible IC driver 101b. The converter 101 connects these IC drivers at a TTL level (IC voltage level) and converts the communication data from data for RS232C to data for RS422 (RS485). Further, this multiaxis driving control system has a plurality of servo-amplifiers 103 each having an RS422 (RS485) communication interface 102.

The RS232C communication medium 100 is connected to the IC driver 101a side of the converter 101 with an RS232C cable 104. On the other hand, the IC driver 101b side of the converter 101 is connected to the RS422 (RS485) communication interface 102 of the servo-amplifier 103 with an RS422 (RS485) cable 105. The servo-amplifiers 103 are cascaded to each other with the RS422 (RS485) cables 105. RS422 (RS485) communication is a communication that is realized by using a balanced IC driver that is compatible with the standards and being capable of 1-to-N communications characterized as balanced transmission.

A communication sequence of the above mentioned multiaxis driving control system will be explained here. Communications between RS232C communication medium 100 and the converter 101 are performed through RS232C. The converter 101 converts the data received trough RS232C to a communication format for RS422 (RS485) and executes communications with the servo-amplifiers 103. On the other hand, communications between the servo-amplifier 103 and the converter 101 is performed through RS422 (RS485). In this case, the converter 101 converts the data received through RS422 (RS485) to a communication format for RS232C and executes communications with the RS232C communication medium 100.

A communication packet used for the above mentioned communications is generally structured with a combination of a start bit, axis number (station number), command, data, and checksum. A multi-drop communication protocol in which the axis number of a target for communication is specified in the communication packet will be described herein.

As a technology related to the present invention, there are an interface module for communications of a programmable controller having a function of RS232C-RS422 -interconversion as disclosed in the Japanese Patent Laid-Open Publication No. HEI 3-251903 or a programmable controller having a serial communication port for RS232C and a serial communication port for RS422 for selectively using either one of the ports as disclosed in the Japanese Patent Laid-Open Publication No. HEI 6-110510.

In order to realize multi-drop communications in the above mentioned multiaxis driving control system, it is necessary that the multi-drop communication system has the RS422 (RS485) which is capable of performing 1-to-N communications. In addition, in order to realize communications with an RS232C communication medium as 1-to-1 communications, it is necessary to convert communication data for RS232C to communication data for RS422 (RS485) and also convert communication data for RS422 (RS485) to communication data for RS232C.

In order to perform the conversion of data as mentioned above, it is necessary to provide a dedicated converter as an additional unit in between an RS232C communication medium by a personal computer or the like and a servo-amplifier in the conventional communication systems. This results in an increase in the number of system components, which in turn reduces the transmission efficiency.

SUMMARY OF THE INVENTION

It is an object of the present invention to provide, for the purpose of solving the problems as described above, a servo-amplifier for a multiaxis driving control system with a communication interface enabling communications between an RS232C communication medium and a servo-amplifier through RS232C as well as enabling multi-drop communications to a plurality of servo-amplifiers through RS422 (RS485).

In the servo-amplifier for a multiaxis driving control system according to the present invention, the data received through communication with RS232C is fetched into a local station as well as the received data is converted into communication data for RS422 (RS485) and transmitted to other stations, then the data received through RS422 (RS485)-communication is converted into communication data for RS232C and transmitted to the other stations. Therefore, communication between a RS232C communication medium based on RS232C and a servo-amplifier and multi-drop communications to a plurality of servo-amplifiers with RS422 (RS485) can be performed without providing a dedicated converter.

Other objects and features of this invention will become apparent from the following description with reference to the accompanying drawings.

DESCRIPTION OF THE PREFERRED EMBODIMENTS

Detailed description is made hereinafter for the preferred embodiments of a servo-amplifier for a multiaxis driving control system according to the present invention with reference to the attached drawings. Incidentally, same reference numerals are assigned to the components in these embodiments that correspond to those in the example based on the conventional technology, and description thereof is omitted herein.

Figure 1:
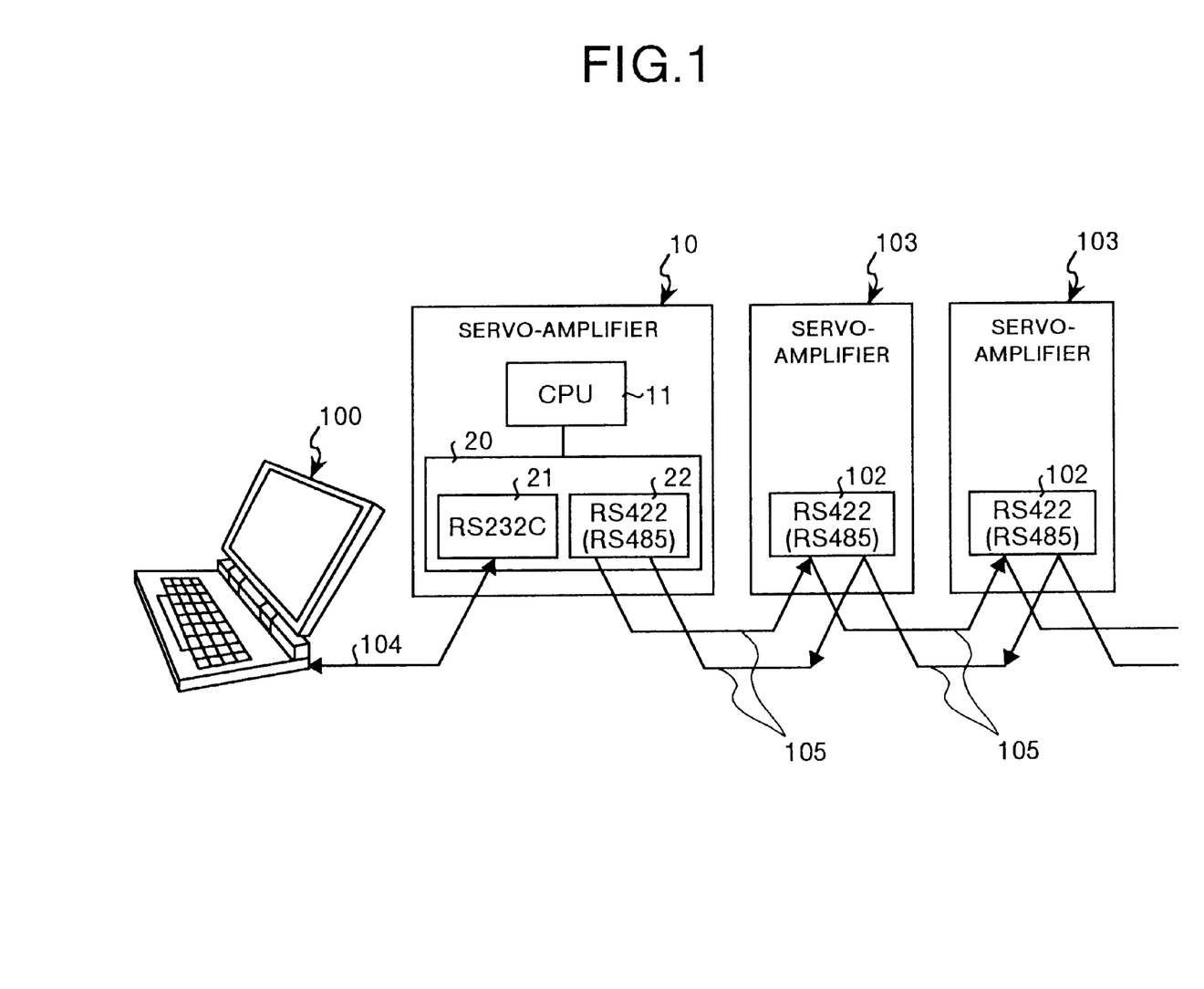
FIG. 1 shows the system configuration of a multiaxis driving control system including a servo-amplifier according to Embodiment 1 of the present invention.

FIG. 1 shows a multiaxis driving control system including a servo-amplifier according to Embodiment 1 of the present invention. This multiaxis driving control system comprises an RS232C communication medium 100 by a personal computer or the like that performs the main control over communications; a servo-amplifier 10 according to the present invention; and a plurality of servo-amplifiers 103 each having a RS422 (RS485) communication interface 102. The RS232C communication medium 100 and the servo-amplifiers 103 are the same as those utilized in the conventional technology.

The servo-amplifier 10 is a servo-amplifier which servo-amplifier is the closest among the servo-amplifiers connected to the RS232C communication medium 100. This servo-amplifier 10 has a CPU 11 which performs the overall processing in the entire servo-amplifier 10. The servo-amplifier 10 also has a hybrid serial communication interface 20 with an interface circuit 21 for RS232C communications as well as with an interface circuit 22 for RS422 (RS485) communications.

The RS232C communication medium 100 is connected to the RS232C communication interface circuit 21 in the servo-amplifier 10 with a RS232C cable 104. The RS422 (RS485) communication interface circuit 22 of the servo-amplifier 10 is connected to the RS422 (RS485) communication interface 102 in the servo-amplifier 103 provided in the rear stage with the help of a RS422 (RS485) cable 105. The servo-amplifiers 103 are cascaded to each other by connecting RS422 (RS485) communication interfaces 102 thereof to each other with the RS422 (RS485) cables 105 respectively.

With the processing performed by the CPU 11 the servo-amplifier 10 fetches the data received by the RS232C communication interface circuit 21, converts this received data to communication data for RS422 (RS485) and transmits this converted data from the RS422 (RS485) communication interface circuit 22 to other stations. On the other hand, the servo-amplifier 10 converts the data received by the RS422 (RS485) communication interface circuit 22 to communication data for RS232C and transmits the converted data from the RS232C communication interface circuit 21 to the RS232C communication medium 100.

Figure 2:
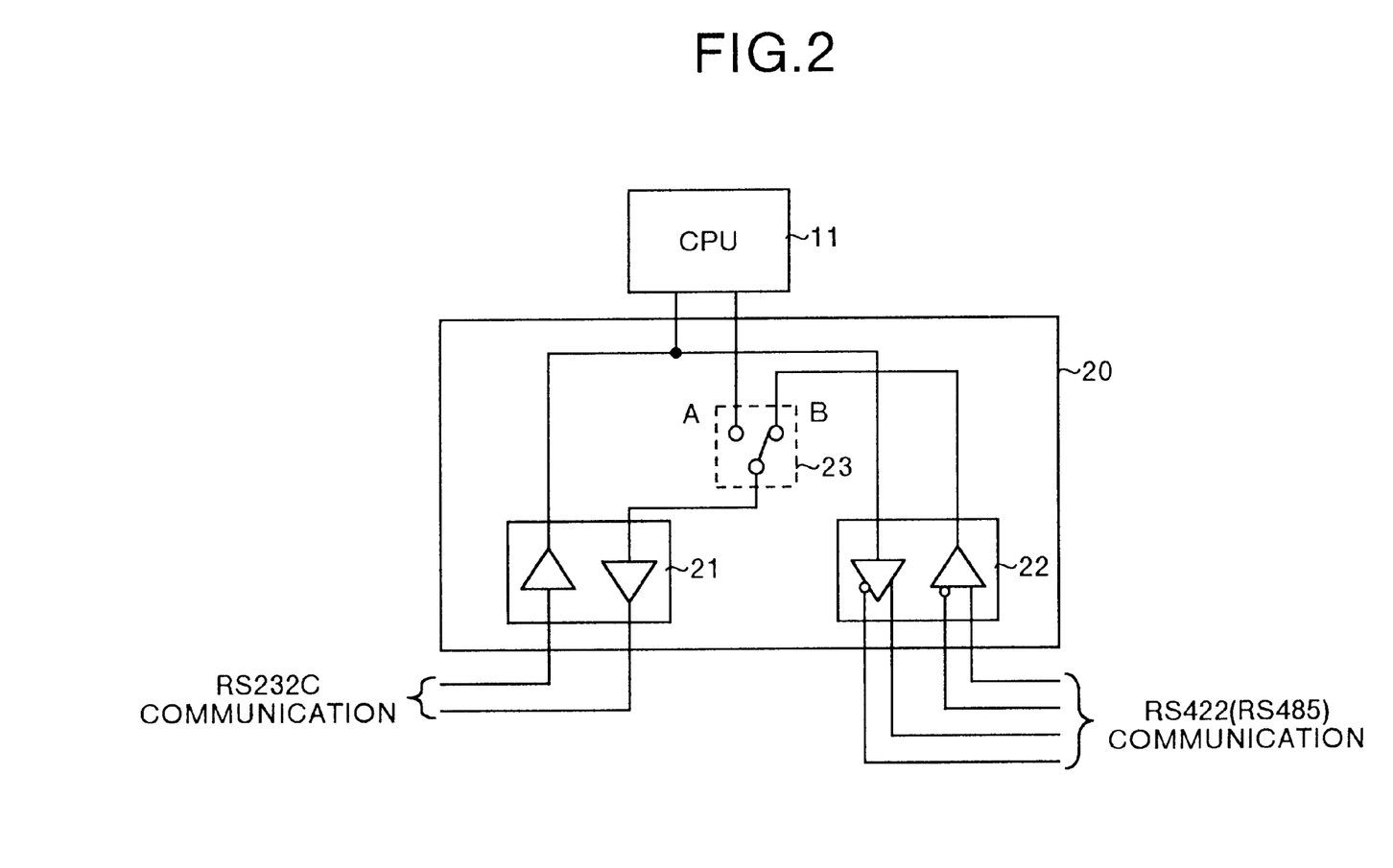
FIG. 2 is a block diagram showing a detail construction of a hybrid serial communication interface used in the servo-amplifier according to Embodiment 1.

FIG. 2 shows the internal construction of the hybrid serial communication interface 20 in detail. The hybrid serial communication interface 20 has a switch 23. The reception side of the RS232C communication interface circuit 21 is connected to the CPU 11 as well as to the transmission side of the RS422 (RS485) communication interface circuit 22, while the transmission side of the RS232C communication interface circuit 21 is selectively switched by the switch 23 to either the reception side (position B) of the RS422 (RS485) communication interface circuit 22 or to the CPU 11 (position A). The switch 23 is switched based on an instruction from the CPU 11 according to the axis number in a communication packet received through RS232C-communication.

The RS232C-communication data received by the servo-amplifier 10 from the RS232C communication medium 100 via the RS232C communication interface circuit 21 is inputted into Its own CPU 11 as communication data. This data is then converted to data for RS422 (RS485) communication by the RS422 (RS485) communication interface circuit 22 and outputted.

When the servo-amplifier 10 itself is to answer back to the communication (when an axis specified by the axis number in the communication packet is selected) according to the communication data inputted into the CPU 11 of the servo-amplifier 10, then the switch 23 is switched to the position A and the answer is transmitted back to the RS232C communication medium 100 from the CPU 11 thereof as RS232C-communication. The CPU 11 does not accept RS422 (RS485) communications from other axes under this situation. Therefore, the CPU 11 can answer back to the RS232C communication medium 100 without waiting for the disabled state of the second and third servo-amplifiers 103 to be effected.

When a servo-amplifier 103 on other axis is to answer back to the communication (when an axis other than the one specified by the axis number in the communication packet is selected), then the switch 23 is switched to the position B and communication data inputted from the RS422 (RS485) communication interface circuit 22 is converted to communication data for RS232C by the RS232C communication interface circuit 21 and outputted. The switch 23 is returned back to the position A when the next communication data for RS232C is inputted into the servo-amplifier 10.

With the configuration described above, only by replacing a servo-amplifier connected to the RS232C communication medium 100 with the servo-amplifier 10, it is possible to execute multi-drop communications with the multiaxis driving control system without requiring any other extra converter.

Figure 3:
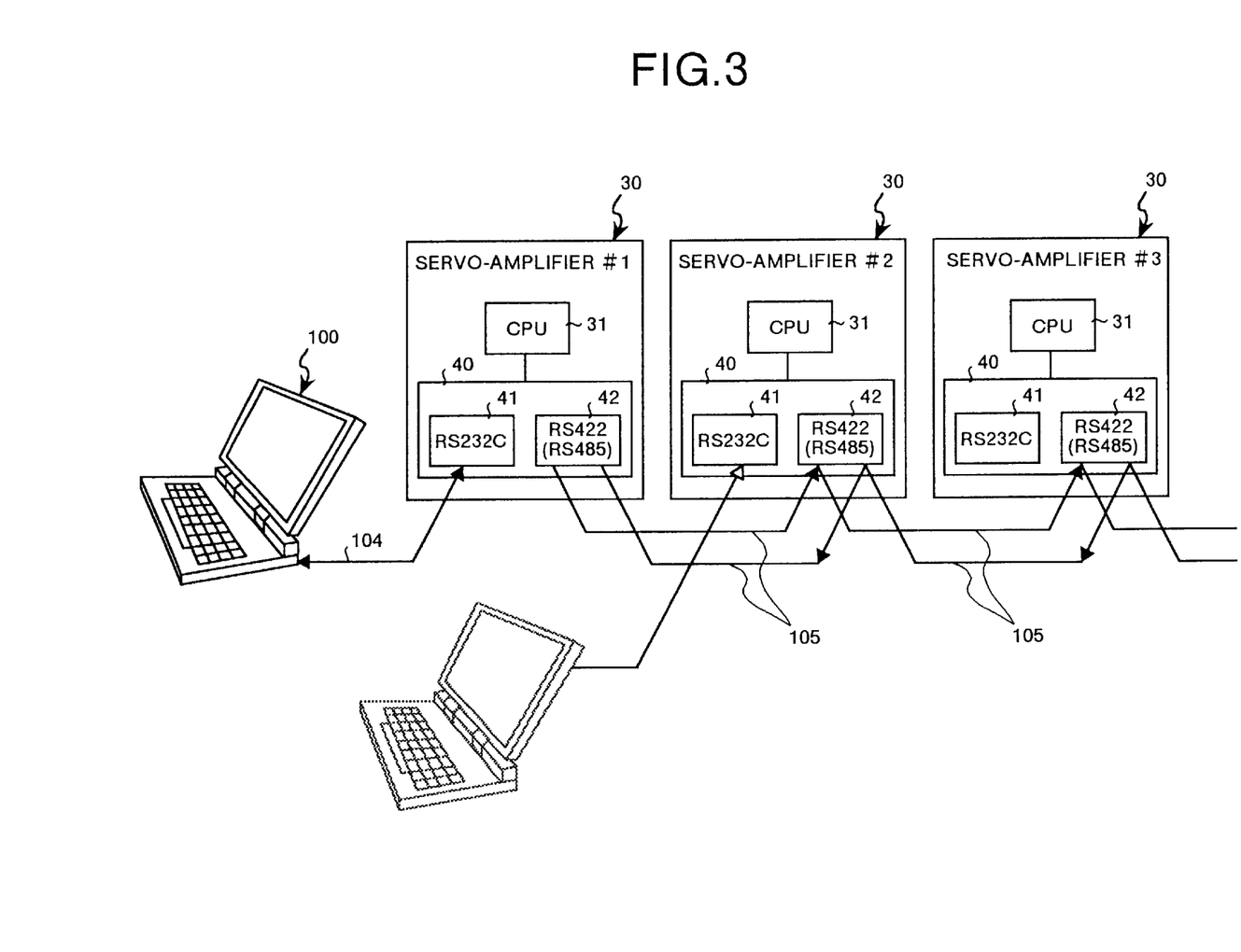
FIG. 3 shows the system configuration of a multiaxis driving control system including a servo-amplifier according to Embodiment 2 of the present invention.

FIG. 3 shows a multiaxis driving control system including a servo-amplifier according to Embodiment 2 of the present invention. This multiaxis driving control system comprises an RS232C communication medium 100 by a personal computer or the like that performs the main control over communications, and a plurality of servo-amplifiers 30 according to the present invention.

The servo-amplifier 30 has a hybrid serial communication interface 40 comprising a RS232C communication interface circuit 41 and a RS422 (RS485) communication interface circuit 42. The RS232C communication medium 100 is connected to a RS232C communication interface circuit 41 in any one of the servo-amplifiers 30 with the RS232C cable 104, and all the servo-amplifiers 30 are cascaded by connecting the RS422 (RS485) communication interfaces 42 thereof to each other with RS422 (RS485) cables 105 respectively.

Figure 4:
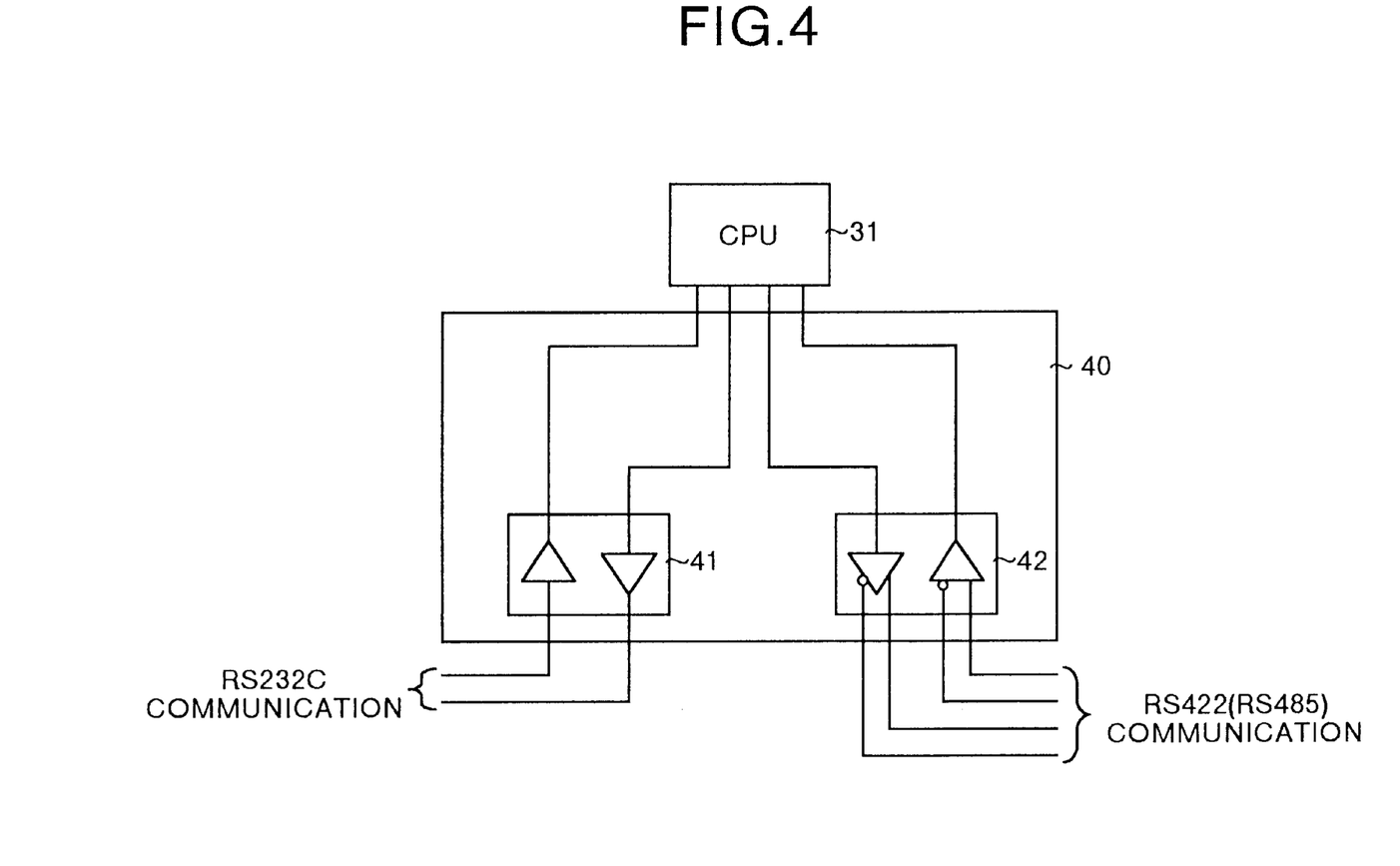
FIG. 4 is a block diagram showing a detail construction of a hybrid serial communication interface used in the servo-amplifier according to Embodiment 2.

FIG. 4 shows the internal construction of the hybrid serial communication interface 40 in detail. In the hybrid serial communication interface 40, reception and transmission sides of the RS232C communication interface circuit 41 as well as reception and transmission sides of the RS422 (RS485) communication interface 42 are connected to a CPU 31, and then RS232C-communication and RS422 (RS485)-communication through two channels for serial communications are switched.

Operations will be explained here. At first, the operations of the servo-amplifier on a first axis will be explained. RS232C-communication data received by the RS232C communication interface circuit 41 in the servo-amplifier 30 corresponding to the first axis is inputted into the CPU 31 of that servo-amplifier 30. This data is then outputted from the RS422 (RS485) communication interface 42 in the servo-amplifier 30 corresponding to the first axis to a servo-amplifier 30 corresponding to a second axis as RS422 (RS485)-communication.

Conversely, RS422 (RS485)-communication data transmitted from any of servo-amplifiers on the second axis and thereafter and received by the RS422 (RS485) communication interface 42 in the first-axial servo-amplifier 30 is inputted into the CPU 31 on the first axis as communication data to be sent to the RS232C communication interface circuit 41, the data is converted to communication data for RS232C by the RS232C communication interface circuit 41, and the converted data is transmitted to the RS232C communication medium 100. In this case, the servo-amplifier 30 corresponding to the first axis itself can also prepare transmission data and send the data back to any servo-amplifier 30 on the second axis and thereafter.

In this embodiment, the servo-amplifier 30 corresponding to the first axis can function not only as an interface with the RS232C communication medium 100 but also as a communication master station for any of the servo-amplifier 30 on the second axis and thereafter. For example, when an instruction is to be sent to all the axes (an instruction to specify all the axes), in case of the conventional technology the RS232C communication medium 100 has to be executed according to communications for a number of times which is equivalent to the number of axes provided in the system. However, in case of the present invention the RS232C communication medium 100 is required to give an instruction to only the amplifier on the first axis, while the CPU in the amplifier 3 corresponding to the first axis can automatically and successively give the instruction to the amplifiers corresponding to the second axis and thereafter. This allows an amount of work of the RS232C communication medium 100 to be suppressed.

Furthermore, in this embodiment, the CPU 31 in the servo-amplifier 30 corresponding to the first axis can also answer back to the RS232C communication medium 100 without waiting for the disabled state of the second and third servo-amplifiers 30 to be effected, and a user program in the RS232C communication medium 100 can also be simplified. Incidentally, in this embodiment, the RS232C communication medium 100 can be connected to any of second and third servo-amplifiers 30 in place of the first servo-amplifier 30.

Figure 5A:
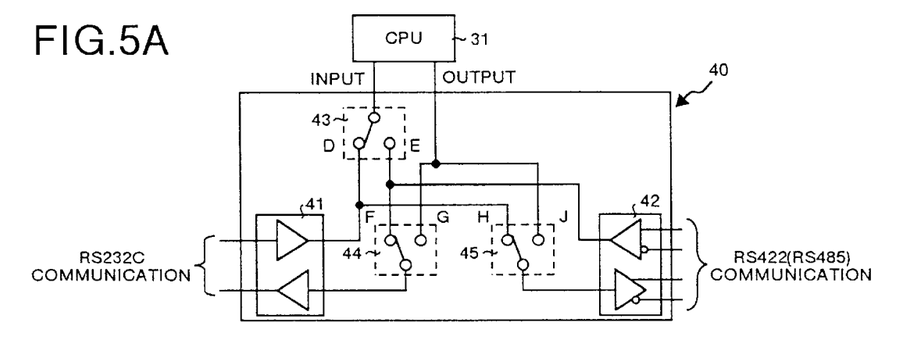
FIG. 5A to FIG. 5C are block diagrams each showing a detail construction of an another example of the hybrid serial communication interface used in the servo-amplifier according to Embodiment 2.
Figure 5B:
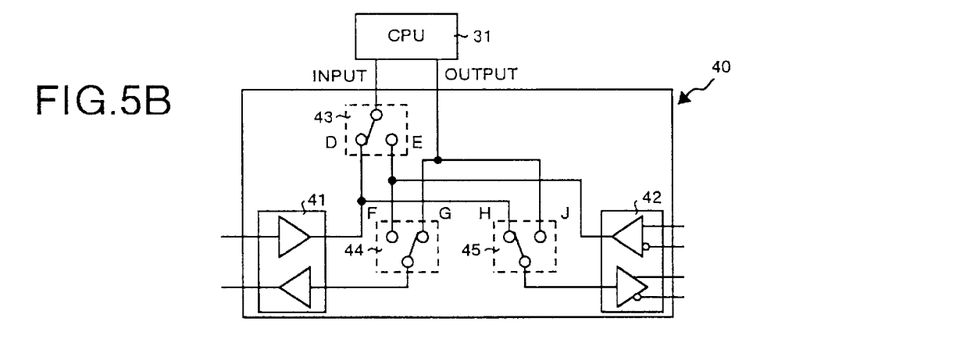
Figure 5C:
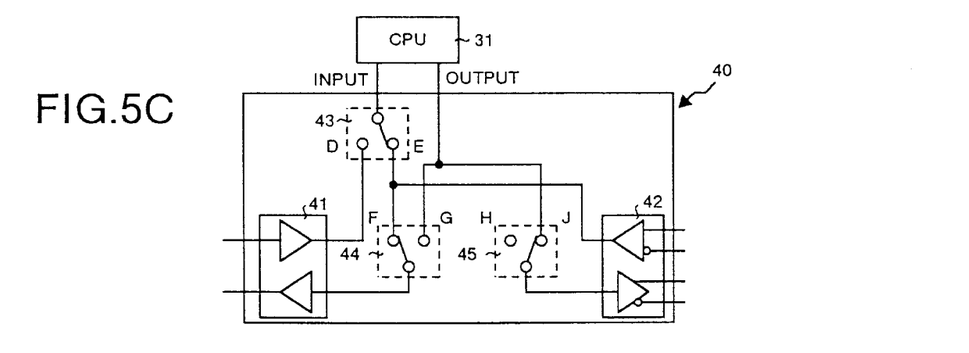

FIG. 5A to FIG. 5C show an another example of the hybrid serial communication interface 40 used in the servo-amplifier 30 according to Embodiment 2. The hybrid serial communication interface 40 in these figures is different from that shown in FIG. 4 in such a point that RS232C-communication and RS422 (RS485)-communication are switched through one channel for serial communications. Further, the hybrid serial communication interface 40 in these figures has a reception selector switch 43, a first transmission selector switch 44, and a second transmission selector switch 45.

The reception selector switch 43 selectively switches input into the CPU 31 to either the reception side (position D) of the RS232C communication interface circuit 41 or to the reception side (position E) of the RS422 (RS485) communication interface 42. The first transmission selector switch 44 selectively switches the transmission side of the RS232C communication interface circuit 41 to the output (position G) from the CPU 31 or the reception side (position F) of the RS422 (RS485) communication interface 42. The second transmission selector switch 45 selectively switches the transmission side of the RS422 (RS485) communication interface 42 to the output (position J) from the CPU 31 or to the reception side (position H) of the RS232C communication interface circuit 41.

Operations are explained here. FIG. 5A shows a state of waiting for reception of RS232C-communication data from the RS232C communication medium 100. In this state, the reception selector switch 43 is switched to the position D according to RS232C-communication data received by a servo-amplifier 30, and the RS232C-communication data from the RS232C communication medium 100 received by the servo-amplifier 30 is inputted into the CPU 31 of the amplifier corresponding to the first axis itself as communication data and also sent to the RS422 (RS485) communication interface 42 because the second transmission selector switch 45 is switched to the position H, the data sent is converted to communication data for RS422 (RS485) to be outputted to the servo-amplifier 30 on the second axis and then to that on third axis.

When the servo-amplifier 30 corresponding to the first axis itself outputs data (when answering back to the RS232C communication medium 100), as shown in FIG. 5B, the first transmission selector switch 44 is switched to the position G, communication data for RS232C is outputted from the RS232C communication interface circuit 41 to the RS232C communication medium 100.

In this case, since the transmission side of the RS232C communication medium 100 is separated from the reception side of the RS422 (RS485) communication interface 42, the CPU 31 can answer back to the RS232C communication medium 100 without waiting for the disabled state of the servo-amplifiers 30 corresponding to the second and third axes to be effected. When the servo-amplifiers 30 corresponding to the second and third axes are to output the data, the first transmission selector switch 44 is switched to the position F, communication data for RS422 (RS485) received by the RS422 (RS485) communication interface 42 is sent to the RS232C communication interface circuit 41, and the data is converted to communication data for RS232C to be outputted to the RS232C communication medium 100.

When only RS422 (RS485)-communication is validated between the servo-amplifiers 30 without answering back to the RS232C communication medium 100, as shown in FIG. 5C, the reception selector switch 43 is switched to the position E, and the second transmission selector switch 45 is switched to the position J. With this operation, the CPU 31 of the servo-amplifier 30 corresponding to the first axis can transmit data to the servo-amplifiers 30 corresponding to the second and third axes through RS422 (RS485)-communication, and data is transmitted from the servo-amplifiers 30 corresponding to the second and third axes to the CPU 31 in the servo-amplifier 30 corresponding to the first axis through the RS422 (RS485)-communication.

As described above, with the servo-amplifier for a multiaxis driving control system according to the present invention, the data received through communication with RS232C is fetched into a local station as well as the received data is converted into communication data for RS422 (RS485) and transmitted to other stations, then the data received through RS422 (RS485)-communication is converted into communication data for RS232C and transmitted to the RS232C communication medium 100. Therefore, communication between a RS232C communication medium based on RS232C and a servo-amplifier and multi-drop communications to a plurality of servo-amplifiers with RS422 (RS485) can be performed without providing a dedicated converter. This results in a reduction in the number of system components and enhances the transmission efficiency.

In the servo-amplifier for a multiaxis driving control system according to another aspect of the present invention, a switch selectively switches a transmission side of a RS232C communication interface circuit to a reception side of a RS422 (RS485) communication interface circuit or to a CPU of a local station. Therefore, the CPU of the local station can answer back to an RS232C communication medium without waiting for a disabled state of servo-amplifiers provided in the rear stages to be effected.

In the servo-amplifier for a multiaxis driving control system according to another aspect of the present invention, RS232C-communication and RS422 (RS485)-communication through two channels for serial communications are switched to each other. Therefore, CPU of a local station can answer back to an RS232C communication medium without waiting for a disabled state of servo-amplifiers provided in rear stages to be effected. This results into a reduction in the amount of work of the RS232C communication medium by a personal computer or the like by the use of the servo-amplifier as a master station.

In the servo-amplifier for a multiaxis driving control system according to another aspect of the present invention, RS232C-communication and RS422 (RS485)-communication are switched through one channel for serial communications. Therefore, CPU of a local station can answer back to an RS232C communication medium without waiting for a disabled state of servo-amplifiers provided in rear stages to be effected, so that requirements can be fulfilled with a simple system.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A servo-amplifier for a multiaxis driving control system that drives and controls an axis by transmitting and receiving to and from a RS232C communication medium in charge of communications and other servo-amplifiers, and communication data including an axis number indicating a communication destination, the servo-amplifier comprising:
    a central processing unit;
    a RS232C communication interface circuit;
    a RS422 (RS485) communication interface circuit; and
    a switch that selectively connects a transmission side of the RS232C communication interface circuit to one of a reception side of the RS422 (RS485) communication interface circuit and the central processing unit,
    wherein the central processing unit:
        fetches communication data received through the RS232C communication interface circuit,
        converts the received communication data into communication data for RS422 (RS485) and transmits the converted communication data to another servo-amplifier through the RS422 (RS485) communication interface circuit,
        controls the switch to connect the transmission side of the RS232C communication interface circuit with the central processing unit and transmits the communication data to the RS232C communication medium, when the axis number included in the communication data received through the RS232C communication interface circuit specifies a station the servo-amplifier belongs to, and
        controls the switch to connect the transmission side of the RS232C communication interface circuit with the reception side of the RS422 (RS485) communication interface circuit and transmits communication data received from another servo-amplifier to the RS232C communication medium, when the axis number included in the communication data received through the RS232C communication interface circuit specifies a destination other than the station.

2. A servo-amplifier for a multiaxis driving control system that drives and controls an axis by transmitting and receiving to and from a RS232C communication medium in charge of communications and other servo-amplifiers, communication data including an axis number indicating a communication destination, the servo-amplifier comprising:
    a central processing unit;
    a RS232C communication interface circuit;
    a RS422 (RS485) communication interface circuit;
    a reception switch that selectively connects an input of the central processing unit to one of a reception side of the RS232C communication interface circuit and a reception side of the RS422 (RS485) communication interface circuit;
    a first transmission switch that selectively connects a transmission side of the RS232C communication interface circuit to one of the reception side of the RS422 communication interface circuit and an output of the central processing unit; and
    a second transmission switch that selectively connects a transmission side of the RS422 (RS485) communication interface circuit to one of the reception side of the RS232C communication interface circuit and the output of the central processing unit,
    wherein the central processing unit controls:
        the reception switch to connect the input of the central processing unit with the reception side of the RS232 communication interface circuit and the second transmission switch to connect the transmission side of the RS422 (RS485) communication interface circuit with the output of the CPU, while the central processing unit is waiting to receive communication data from the RS232C communication medium,
        the first transmission switch to connect the transmission side of the RS232C communication interface circuit with the output of central processing unit and transmits the communication data to the RS232C communication medium, when the axis number included in the communication data received through the RS232C communication interface circuit specifies a station the servo-amplifier belongs to, and
        the first transmission switch to connect the transmission side of the RS232C communication interface circuit with the reception side of the RS422 (RS485) communication interface circuit and transmits communication data received from another servo-amplifier to the RS232C communication medium, when the axis number included in the communication data received through the RS232C communication interface circuit specifies a destination other than the station.

3. The servo-amplifier for a multiaxis driving control system according to claim 2, wherein, when the central processing unit transmits and receives communication data to and from another servo-amplifier, the central processing unit controls:
    the reception switch to connect the input of the central processing unit to the reception side of the RS422 (RS485) communication interface circuit, and
    the second transmission switch to connect the transmission side of the RS422 (RS485) communication interface circuit with the output of the central processing unit.

* * * * *